United States Patent [19]
Yabuta et al.

[11] 4,144,921
[45] Mar. 20, 1979

[54] PNEUMATIC TIRE WITH AN INTERNAL DAMAGE INDICATOR

[75] Inventors: Keiichiro Yabuta; Nagayuki Marumo, both of Yokohama; Yoichi Shimabara, Takatsuki; Masahiro Ishigaki; Ken Ishihara, both of Ibaragi; Yoshiki Mayama, Nishinomiya, all of Japan

[73] Assignees: Nissan Motor Company, Limited, Yokohama; The Toyo Rubber Co., Ltd., Osaka, both of Japan

[21] Appl. No.: 773,349

[22] Filed: Mar. 1, 1977

[30] Foreign Application Priority Data
Mar. 3, 1976 [JP] Japan .................................. 51/23520
Apr. 23, 1976 [JP] Japan .................................. 51/46985

[51] Int. Cl.² .............................................. B60C 19/10
[52] U.S. Cl. ........................... 152/353 R; 152/330 A; 116/34 R
[58] Field of Search ............... 152/330 A, 330 R, 352, 152/353 R, 209 R; 116/34

[56] References Cited
U.S. PATENT DOCUMENTS

| 2,706,509 | 4/1965 | White | 152/330 A |
| 3,362,376 | 1/1968 | Norton | 152/330 R |
| 3,400,745 | 9/1968 | Schwartz | 152/352 |
| 3,516,467 | 6/1970 | Sims | 152/330 A |
| 3,786,850 | 1/1974 | Turoczi, Jr. | 152/330 R |

FOREIGN PATENT DOCUMENTS 1362008   4/1964   France .................................... 152/352

Primary Examiner—Lawrence J. Oresky
Assistant Examiner—D. W. Underwood

[57] ABSTRACT

Projections made of a different and less abrasion resistant kind of rubber to that constituting the exterior of the tire are arranged to contact the road during low pressure conditions, whereby the amount of rubber worn off indicates the amount of fatigue accumulated and degree of internal damage done by running the tire at that pressure.

19 Claims, 16 Drawing Figures

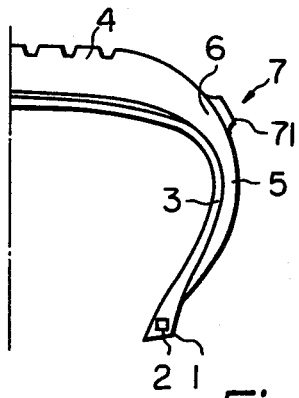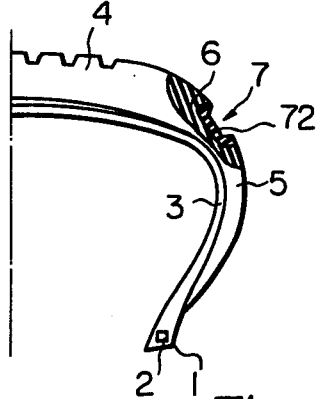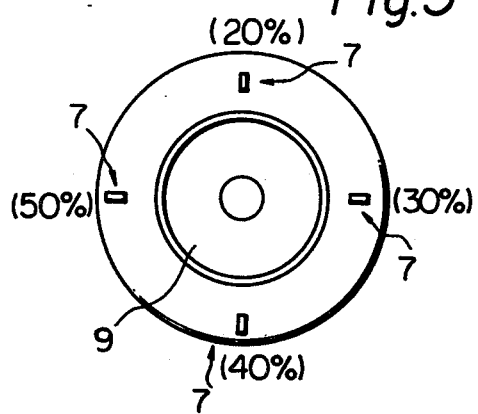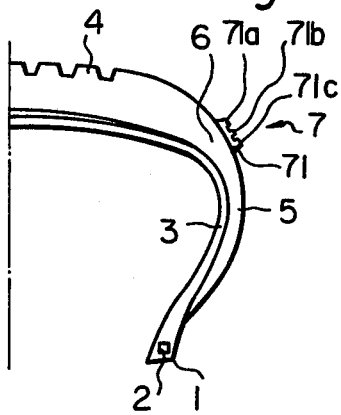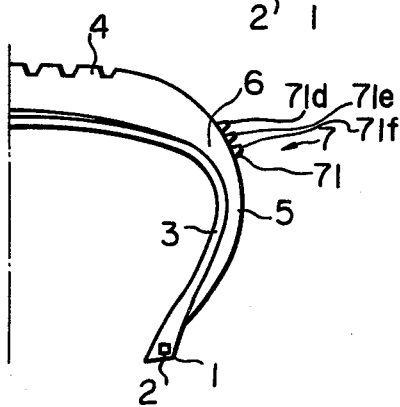

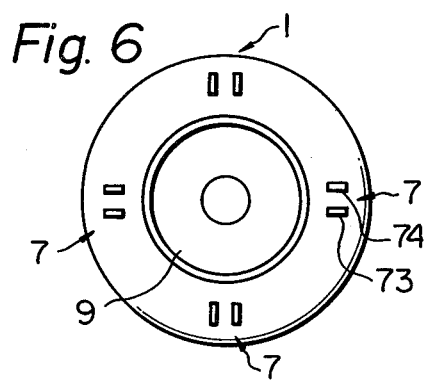
Fig. 6
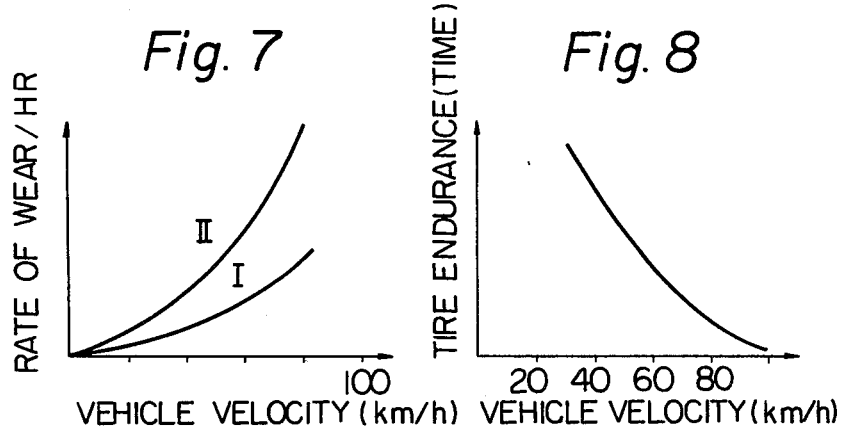
Fig. 7
Fig. 8
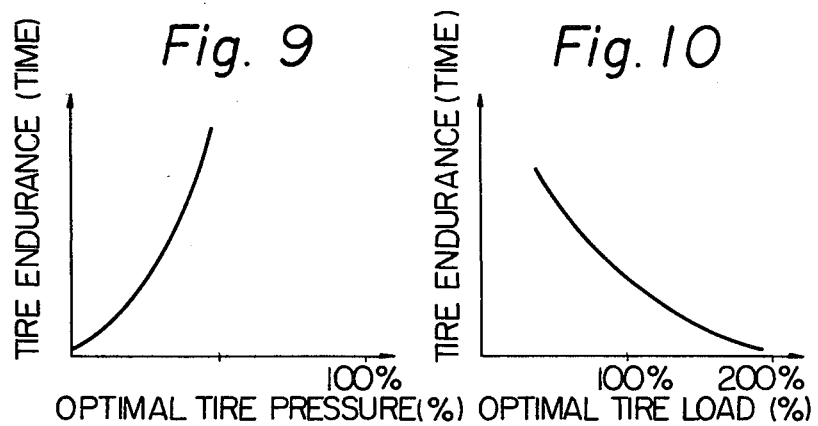
Fig. 9
Fig. 10

PNEUMATIC TIRE WITH AN INTERNAL DAMAGE INDICATOR

This invention relates to a pneumatic tire for a motor vehicle and more particularly to a pneumatic tire equipped with an indicator which shows the accumulated fatigue or internal damage of the tire due to running same at pressures below that required for maximum tire life.

As is well known if a tire is run under inflated excessive flexing of the side walls and associated carcass cords disposed therein causes internal fatigue or damage to accumulate. This fatigue or damage is of course not visible and although the external appearance of the tire, i.e. tread and side walls, appears in good order the tire may very well be ready to blow out. A sudden blowout especially of a tire disposed on the front wheels of a motor vehicle can lead to serious and sometimes fatal accidents.

Thus it is necessary for the driver of the vehicle to be able to ascertain both the internal and external conditions of the tires on the motor vehicle before driving same. The external condition of a tire is usually ascertained by a simple visual inspection but until now there has been no effective method of determining the internal condition of same.

It has been proposed that in order to detect low pressure running of motor vehicle tire that noise generating protrusions or nubs be either formed integrally or be vulcanised or otherwise bonded to the surface of the tire so that they sound generatingly strike the surface of the road which the vehicle is traversing should the pressure within the tire fall to an undesirably low level. This technique is quite effective for alerting the driver to the fact that he or she is driving the vehicle with under inflated tires but fails to provide the driver with a record of the accumulated internal damage resulting from the above mentioned driving. This is especially so after a visit to a garage or gas station where the tires are invariably checked and the pressure adjusted to the correct level, whereby the driver is left to guess the accumulated amount of internal fatigue and damage.

Thus it is an object of this invention to provide a pneumatic tire having an internal damage indicator whereby the driver can at a glance assess the internal condition of the tire.

It is a further object of the invention to provide a pneumatic tire having an internal fatigue or damage indicator which is simple in construction but clearly indicates the internal fatigue or damage of the tire.

It is still another object of the invention to provide a pneumatic tire having an internal damage indicator which is formed in such a manner that an estimation of the amount of internal damage is possible.

Other objects, features and advantages of the present invention will become more apparent from the following description taken in conjunction with the accompanying drawings in which:

FIG. 1 is a cross sectional view of a pneumatic tire according to the invention equipped with an internal damage indicator;

FIG. 2 is a similar cross sectional view but showing an alternate arrangement of the internal damage indicator;

FIG. 3 is an elevational view of a pneumatic tire according to the invention showing one possible arrangement of a plurality of internal damage indicators;

FIG. 4 is a cross sectional view of a pneumatic tire according to the invention showing a design alternative of the internal damage indicator;

FIG. 5 is a cross sectional view similar to FIG. 4 showing another design alternative of the internal damage indicator;

FIG. 6 is an elevational view of a pneumatic tire according to the invention equipped with a plurality of internal damage indicators;

FIG. 7 is a graph showing the relationship between the rate of wear per hour and the vehicle velocity for two different types of elastomeric material used in the pneumatic tire of the invention;

FIG. 8 is a graph showing the relationship between the tire endurance (measured in time) and the vehicle velocity (Km/Hr), the curve indicating the point in time at which the tire under constant pressure and load completely fails and blows out;

FIG. 9 is a graph showing the relationship between the tire endrance (time) and the optimal tire pressure, (100% indicating the optimal pressure or pressure recommended by the manufacturer for maximum life) the curve indicating the point in time at which the tire under constant velocity and load will completely fail and blow out;

FIG. 10 is a graph showing the relationship between the tire endurance (time) and the optimal load, (100% indicating the optimal load or load the tire is designed to carry) the curve indicating the point in time at which the tire completely fails and blows out under constant pressure and velocity;

FIG. 16 shows a projection of the internal damage indicator containing a colored layer or insert for facilitating easy visual checking of the internal condition of the tire it is on.

Figure 11:
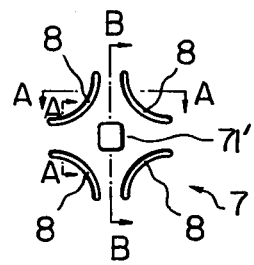
FIG. 11 shows a first possible arrangement of a projection and grooves which constitute the internal damage indicator shown in FIG. 1 or part of the internal damage indiator shown in FIG. 6.

Let us now look at FIG. 1 which as can be seen is half of the tire according to the invention shown in cross section. The numeral 1 denotes a bead portion of the tire which has conventionally disposed therein a bead wire 2. The numeral 3 denotes a carcass and/or ply layer which constitutes the inner construction of the tire. This is covered by an elastomeric material such as rubber. This elastomeric layer may be classified into three sections which are, the tread 4, the shoulder portion 6 and the side wall 5. It will be noted that the other side of the tire is similarly constructed although not shown. Since tire construction is very well known in the art no further constructional details will be given for brevity.

Bonded, vulcanised or formed on the shoulder portion of the tire is an internal damage and fatigue indicator generally denoted by the numeral 7. The location of the indicator (as it will be referred to from hereafter) is so selected that when the tire is correctly inflated the indicator does not contact the surface of the road on which the tire is running but comes into contact with same as the pressure in the tire drops below the above mentioned predetermined amount correct or optimal level.

As shown the first embodiment of the invention has a single projection 71 which may be placed so as to contact the surface of the road when the pressure in the tire drops to, for example 80%, 50% or 40% of the optimal or correct pressure. It is further preferred that the projection is made of an elastomer less abrasion resistant than that constituting the shoulder portion. This permits rapid abrasion of the projection thereby facilitating easy visual detection of internal wear and damage.

FIG. 2 shows an alternative to the projection 71 which is in fact a depression or recess 72. The outer upper edges of the recess may be arranged to be made of a different kind of rubber or elastomer as in the case of the projection of FIG. 1. The function of the recess is identical with that of FIG. 1.

FIG. 3 shows a plurality of wear indicators 7 disposed equidistantly around the tire so as to amongst other things achieve dynamic balance of the tire during high speed rotation of same. However these indicators are arranged at different radii from the center or axis of the wheel. As shown the indicator shown at the topmost portion of the tire is arranged to contact the surface of the road when the pressure in the tire has dropped to 20% of the optimal value. The indicator shown on the left is arranged to contact the road when the pressure in the tire has dropped to 50% of the optimal pressure; the indicator on the right 30% and the bottommost 40%.

The reason for the above arrangement is to provide means whereby if the vehicle was to be for some reason run for some distance on a very low pressure of say 20% of the optimal tire pressure which would severely flex, heat, abrade or otherwise damage the carcass of the tire and greatly hasten the time when the tire will blow out, a permanent record indicating the severity of the damage would remain. If there was only one indicator arranged to contact the surface of the road at say 50% of the optimal pressure there would be evidence of damage but it would not be easily ascertainable whether severe or mild damage had in fact taken place. Conversely if with the arrangement shown in FIG. 3 the tire was run at a pressure of for example 50% then it would be obvious that only mild damage had taken place and the life of the tire although shortened was in no danger of blowing out in the near future.

FIGS. 4 and 5 show an alternative construction of an indicator which permits the above mentioned advantageous ascertainment of the degree of damage using only one, or if desired two indicators. For the purpose of illustration the indicator is shown having three sub-projections or nodes formed on the main projection 71. These nodes 71a, 71b, and 71d, 71e and 71f are arranged in radial alignment and spaced apart so that they contact the surface of the road in turn as the pressure in the tire drops. As before they may be arranged to contact the road at any desirable pressures which can be varied from vehicle to vehicle and type of tire to type of tire.

The arrangement in FIG. 4 is different from that of FIG. 5 in that the depth between the tooth shaped nodes varies. As shown the depth between the nodes 71a, 71b and 71c is less than that between the nodes 71d, 71e and 71f. The depth between the latter penetrating to the tire itself whereby the elastomer of the elastomeric layer is exposed between the nodes (the nodes being made of a different type of elastomer which is less abrasion resistant than that of the elastomeric material defining the shoulder portion. With this arrangement the nodes are appropriately worn should the tire be run under inflated with the result that the closely grouped nodes can be easily compared to ascertain the state or condition of the inner construction of the tire.

The arrangement of FIG. 5 is advantageous in that it is possible to employ a different elastomer for each node. Node 71d can be made of an elastomer "A", node 71e elastomer "B" and node 71f elastomer "C". Thus it is possible to arrange the hardness or abrasion resistance of elastomers, so that during very low pressure running of the tire the nodes will be worn off the tire in approximate proportion to the high rate of damage.

Let us now turn to FIG. 6 wherein there is shown yet another embodiment of the invention. As shown there are a plurality of pairs of projections, each pair consisting of projections 73 and 74. The projections 73 and 74 are arranged so as to be equidistant from the axis of rotation of the rim 9 or circumferentially aligned as compared to the radial alignment of the node of the first embodiment. However in this embodiment it is necessary for projections 73 and 74 to be made of different elastomers, one being more durable than the other. As in the case of FIG. 3 it is possible and preferable to arrange the plurality of pairs at various radii for the same reason set forth in connection with FIG. 3. However as mentioned previously to facilitate easy inspection in this embodiment it is necessary to employ two different elastomer whereby comparison of the two different wear rates reveal at a glance if considerable internal damage has in fact taken place.

If desired it is possible to form each of the projections 73 and 74 with nodes as in the case of FIGS. 4 and 5 to provide means for more clearly calibrating the degree of damage.

FIGS. 7 to 10 demonstrate graphically the characteristics of tires and the materials used therein. FIG. 7 shows the wear characteristics of two different elastomers. At any given speed it can be seen that the first elastomer I has a lower wear rate than elastomer II. According to this invention it is preferable that the elastomer layer be made of a rubber similar to I and the projections be made of a rubber II having less wear resistance to make obvious the abrasion due to low pressure running of the tire. Furthermore it is obvious that the rate of wear increases non-linearly with vehicle velocity whereby if only a single type of elastomer is employed in the wear indicator the amount of internal damage will be obvious from the amount of elastomer worn off, that is to say, the amount of elastomer remaining. Hence it will be understood from the curve II of FIG. 7 and the curve of FIG. 8 that the abrasion resistance of the elastomer or elastomers comprising or constituting the wear indicator will be so selected that in each case the amount of elastomer which is abraded is substantially proportional to the rate at which damage to the inner construction or accumulation of fatigue takes place.

Factors influencing the above selection would of course include the type of tire and the purpose for which it is intended, the weight of the vehicle it is designed to be fitted to etc.

FIGS. 8 to 10 shows the blowout characteristics of tires. In FIG. 8 vehicle velocity is varied while pressure and load are held constant in FIG. 9 the pressure is varied while the load and velocity are maintained constant in FIG. 10 the load is varied, pressure and velocity being constant. All three curves are nonlinear especially at high load, velociy and low pressure clearly demonstrating that the life of the tire is greatly reduced by abuse of same. It follows that only a short period of high speed running at low pressure with or without an excessive load the tire could be very badly damaged internally and as described earlier, blowout, despite the fact that it appears brand new.

Hence, although the sound or vibration generating nubs or projections of the prior art would immediately alert the driver to the fact that there was a low pressure condition in at least one of the tires, there would be virtually no way that the driver, after restoring the pressure to normal could be sure of just how much damage had in fact taken place. Although sound generation is not a prime object of this invention it will be obvious to those skilled in the art that the projections employed in both the embodiments of the invention thus far described, could very easily be arranged to generate sound or vibration.

However in some extreme cases it is possible that vibration could prove disastrous. Take for example the case of a car or motor vehicle traversing a corner under wet conditions and with at least one tire underinflated. It will be realized that the vibration of the sound generating projections, which are usually made of a material harder than the rest of the tire, could actually cause the tire to be vibrated out of contact with the surface of the road to result in an extremely hazardous slip which in turn could result in skidding of the vehicle.

Figure 12:
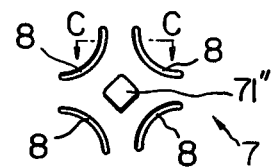
FIG. 12 shows a first possible arrangement of a projection and grooves which constitute the internal damage indicator shown in FIG. 1 or part of the internal damage indicator shown in FIG. 6.
Figure 13:
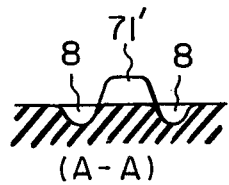
FIG. 13 is a section taken along the section line A—A of FIG. 11.
Figure 14:
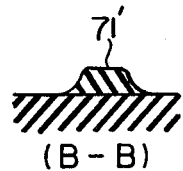
FIG. 14 is a section taken along the section line B—B of FIG. 11.
Figure 15:
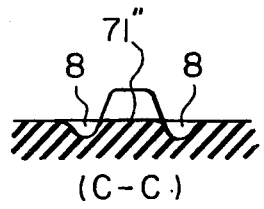
FIG. 15 is a sectiion taken along the line C—C of FIG. 12.

Thus in FIGS. 11 and 12 we can see two possible arrangements which reduce abnormal vibration generated by the projections of this invention to a level where the above mentioned short comming is completely eliminated. As shown a plurality of grooves are formed about the feet of the projections, in this case denoted by numerals 71' and 71", thus providing space into which the projections may distorted. FIGS. 13, 14 and 15 clearly show how the grooves provide space for the above mentioned distortion. Additionally the grooves themselves may be employed as part of the indicator, being similar to the case shown in FIG. 2. Once the projection is worn off the grooves will, should the low pressure condition persist long enough, become shallower as the rubber is worn off.

In order to provide an even further aid to the visual ascertainment of the internal condition of the tire it is preferable that coloured layers or inserts be incorporated into the projections of the pneumatic tire according to this invention.

Figure 16:
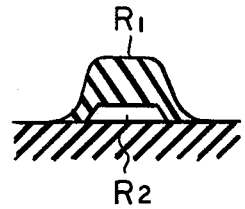

FIG. 16 shows one coloured layer shown having a colour denoted by $R_2$, the rest of the projection being a colour $R_1$. It is of course possible to insert several layers of different colours and even different compositions. The uppermost layer may be, for example, green the next orange and the next red; red being used to indicate dangerous wear of the ply and the cords constituting same. However, any other colour system is possible.

What is claimed is:

1. A pneumatic tire comprising:
   internal damage indicating means disposed on at least one shoulder portion of the tire and arranged so as to be out of contact with the surface of the road when the tire is correctly inflated but contact the surface of the road when the pressure in the tire drops below a predetermined level, said internal damage indicating means being made of an elastomeric material which is less abrasion resistant than the elastomeric material constituting the tread portion, shoulder portions and the side wall portions of the tire, so that contact of the internal damage indicating means with the surface of the road wears off a portion of said internal damage indicating means, the amount being worn off being substantially proportional to the amount of internal damage done to the tire by running same at a pressure below said predetermined level, wherein said internal damage indicating means comprises at least two projections which are arranged so as to be equidistant from the axis of rotation of the rim on which the tire is mounted, and spaced apart small distances so that the leading edge of each projection is located on the same circumferential line which endlessly extends around the shoulder portion of the tire, each of said projections being made of a different elastomeric material than the other.

2. A pneumatic tire for a motor vehicle comprising:
   a carcass;
   an elastomeric layer of a first elastomeric material carried on the outer portion of said carcass, said elastomeric layer being formed with a tread portion, two side wall portions and two should portions, each of said shoulder portions merging with said tread portion and one of said two side wall portions; and
   means for visually indicating the amount of accumulated fatigue and internal damage of said carcass, said means being affixed to one of said two shoulder portions and out of contact with the surface on which said tire is rolling when said tire is correctly inflated at a first predetermined pressure and to contact said surface upon the pressure in said tire falling a predetermined amount below said first predetermined pressure,
   said means being made of at least one elastomeric material which has different abrasion characteristics as compared with said first elastomeric material, said at least one elastomeric material being selected so that the rate of abrasion of said means upon contacting said surface is substantially proportional to the rate at which fatigue and internal damage are accumulated in said carcass when said tire rolls on said surface upon the pressure falling said predetermined amount below said first predetermined pressure, whereby the amount of accumulated fatigue and internal damage is indicated by the amount of abrasion of said means.

3. A pneumatic tire as claimed in claim 2 wherein said means comprises:
   at least one projection which projects beyond the surface of said shoulder portion.

4. A pneumatic tire as claimed in claim 2 wherein said means comprises:
   at least one group of at least two projections which are spaced from each other by small distances and which are aligned along a circumferential line which endlessly extends around said at least one of said two shoulder portions so that at least two projections come into contact with said surface upon said pressure falling said predetermined amount below said first predetermined pressure, each of said at least two projections being formed of a different elastomeric material having different abrasion characteristics which are so selected that the rate of abrasion of each projection upon contacting said surface is different and the difference in the amount abraded from each projection upon contact with said surface is substantially proportional to the amount of fatigue and internal damage accumulated in said carcass.

5. A pneumatic tire as claimed in claim 2 wherein said means comprises:
at least one group of at least two projections which are spaced from each other by small distances and arranged to be aligned along the same radial line which extending from the axis of rotation of said tire and at different radii from said axis so that said projections contact said surface one by one as the pressure in said tire drops stepwisely by predetermined amounts below said first predetermined pressure, said at least two projections each being formed of different elastomeric materials which are selected so that the rates of abrasion thereof are respectively substantially proportional to the rates of accumulation of fatigue and internal damage in said carcass at the respective pressures below said first predetermined pressure at which each of said projections contacts said surface.

6. A pneumatice tire as claimed in claim 2, wherein said means comprises:
a plurality of projections arranged equidistantly around the circumference of said one of said two shoulder portions and each at a different radius from the axis of rotation of said tire such that the projections contact said surface one by one as the pressure in said tire drops stepwisely by predetermined amounts below said first predetermined pressure said projections being formed of different elastomeric materials which are so selected that the rates of abrasion thereof are respectively, substantially proportional to the rates of accumulation of fatigue and internal damate of said carcass at the respective pressures below said first predetermined presssure at which each of said projections contact said surface.

7. A pneumatic tire as claimed in claim 2, wherein said means comprises:
at least one projection having at least two nodes formed thereon which are aligned along a radial line which extends from the axis of rotation of said tire and which are at a different radius from said axis, said at least one projection positioned so said nodes come into contact with said surface one by one as the pressure in said tire drops stepwisely by predetermined amounts below said first predetermined pressure.

8. A pneumatic tire as claimed in claim 7, wherein said nodes are each formed of different elastomeric materials which are so selected that the rates of abrasion thereof upon contacting said surface are respectively, substantially proportional to the rates of accumation of fatigue and internal damage of said carcass at the respective pressures below said first predetermined pressure at which each of said nodes contacts said surface.

9. A pneumatic tire as claimed in any one of claim 3, wherein each projection has a plurality of grooves formed at the foot thereof for providing spaces into which said projection can be distorted to reduce the level of the vibrations produced upon said projection contacting said surface.

10. A pneumatic tire for a motor vehicle comprising:
a carcass;
an elastomeric layer of a first elastomeric material carried on the outer portion of said carcass, said elastomeric layer being formed with a tread portion, two shoulder portions and two side wall portions, each of said shoulder portions merging with said tread portion and with one of said two side wall portions; and
means for visually indicating the amount of fatigue and internal damage accumulated in said carcass, said means being affixed to one of said two shoulder portions and including:
at least two projections which are spaced from each other small distances and which are so constructed and arranged as to be aligned along the same circumferential line which endlessly extends around said at least one shoulder portion and to out of contact with the surface on which said tire is rolling when said tire is correctly inflated at a first predetermined pressure and come into contact with said surface upon the pressure in said tire falling by a predetermined amount below said first predetermined pressure, each of said at least two projections being formed of different elastomeric materials having different abrasion characteristics and the difference in the amount abraded from each projection is substantially proportional to the amount of fatigue and internal damage accumulated in said carcass.

11. A pneumatic tire as claimed in claim 2 further comprising:
at least one layer of a material having a color different from that of said means and which is buried in said means so that upon said means being abraded a predetermined amount said at least one layer becomes visable.

12. A pneumatic tire as claimed in claim 2 wherein said means comprises:
a recess formed in the shoulder portion of the tire.

13. A method for indication of internal wear of a pneumatic tire for a motor vehicle comprising:
adding means for visually indicating the amount of accumulated fatigue and internal damage to the carcass of said tire to one of the shoulder portions of the tire in a position on one of said shoulder portions which is out of contact with the surface on which said tire is rolling when said tire is correctly inflated and in contact with said surface when the pressure of said tire is less than a predetermined amount below said correctly inflated pressure, said means is chosen from a group of elastomeric materials having different abrasion resistance then the elastomeric material found on the outer portion of the carcass of said tire.

14. The method of claim 13 in which said means is formed of at least one projection projecting beyond the surface of the shoulder of said tire.

15. The method of claim 13 in which at least one group of at least two projections are spaced from each other by relatively small distances and aligned along a circumferential line extending around at least one of the shoulder portions, said method further providing for at least two of said projections to come into contact with said surface when the pressure falls below a predetermined amount said method further including the step of choosing elastomeric material for each of at least two projections having abrasion characteristics which are different from each other such that the amount of wear on each of these projections reflects the proportional amount of fatigue and internal damage accumulated in the carcass of said tire.

16. The method of claim 13 which includes placing at least one group of at least two projections spacedly from each other said space being of small distance and arranging said projections along the same radial line extending from the axis of rotation from said tire but a different radii from said axis thereby allowing projections to contact said surface sequentially determined by several predetermined levels of under inflation of said tire.

17. The method of claim 13 in which at least one projection is added having at least two nodes formed thereupon which are aligned along a radial line extending from the axis of rotation of said tire but at a different radius from said axis, such method further including the step of positioning said nodes so that they respectively radially contact said surface at predetermined levels of under inflation.

18. A method as claimed in any of claims 13 wherein the method further includes forming a plurality of grooves at the foot of each projection for providing spaces into which said projection can be distorted to reduce the level of vibrations produced therefrom.

19. The method of claim 13 in which the means is formed of at least one material having a color different from its environment so that when internal wear correlated to tire under inflation reaches a predetermined level, an area is exposed providing a different color.

* * * * *